No. 712,680. Patented Nov. 4, 1902.
T. J. HUBBELL.
SUBSOIL PLOW.
(Application filed Oct. 17, 1901.)
(No Model.)
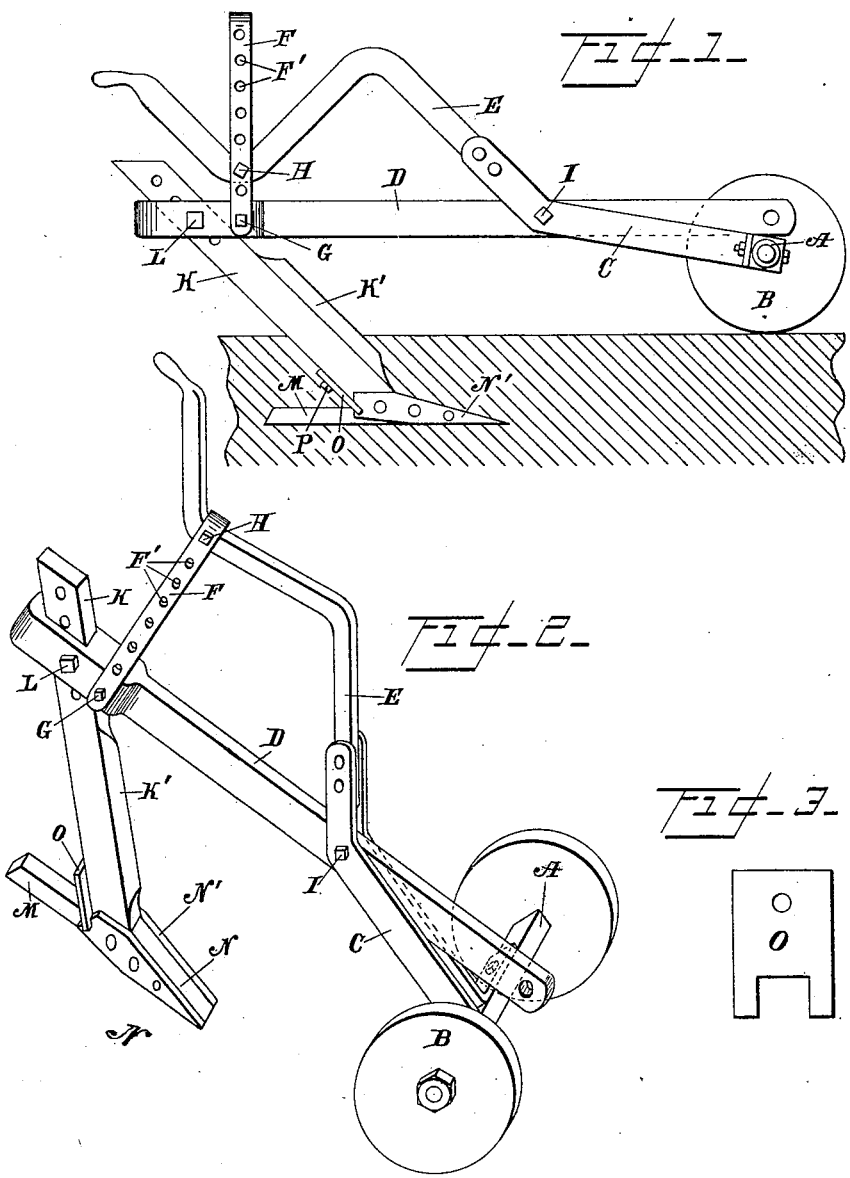
WITNESSES
Chas. L. Hyde.
Mattie McGinnis.
INVENTOR
Thomas J. Hubbell
BY Hazard & Harpham
ATTORNEYS

UNITED STATES PATENT OFFICE.

THOMAS J. HUBBELL, OF POMONA, CALIFORNIA, ASSIGNOR OF ONE-HALF TO R. M. FURLONG, OF PASADENA, CALIFORNIA.

SUBSOIL-PLOW.

SPECIFICATION forming part of Letters Patent No. 712,680, dated November 4, 1902.

Application filed October 17, 1901. Serial No. 79,043. (No model.)

*To all whom it may concern:*

Be it known that I, THOMAS J. HUBBELL, a citizen of the United States, residing at Pomona, in the county of Los Angeles, State of California, have invented new and useful Improvements in Subsoil-Plows, of which the following is a specification.

The object of my improvement is to provide an easily-drawn subsoil-plow which can be easily adjusted so as to cause the plow to enter or come out of the ground and which may be taken from one field to a distant one with ease and without detaching the draft-animals therefrom and without loading the same into a vehicle. I accomplish these objects by the plow described herein and illustrated in the accompanying drawings, forming a part hereof, in which—

Figure 1 is a side view of my plow, partly in the ground, with one of the front wheels thereof removed for clearness of illustration. Fig. 2 is a perspective view of the same in position for transportation. Fig. 3 is a front view of an auxiliary lifting-plate.

In the drawings, A is the axle on which the wheels B are mounted, which form a truck for the support of the front end of the beam D. Centrally affixed to the axle are two attaching-bars C, which pass on each side of the plow-beam D, to which they are pivotally attached by bolt I, from which pivotal point these bars turn at an angle to provide for the attachment therebetween of the regulating-arm E, which passes through stirrup F, pivotally attached to the plow-beam near the rear end thereof by bolt G. This stirrup is provided with a number of holes F' for the passage therethrough and through a hole in arm E of the bolt H to hold the arm at any desired elevation, the purpose being hereinafter explained.

Passing through a socket in the rear end of the plow-beam, at an angle of about forty-five degrees, is the shank K, the front edge K' of which is sharpened below the beam to cut through the earth. The shank is adjustable in the socket, holes being provided in the socket and shank through which a bolt L may be passed to raise or lower it through the beam. To the lower end of the shank is affixed the heel-bar M, which operates as a furrow-bar for each side of the shank. Removably affixed to the lower end of the shank is the point, which is composed of a central part N, which abuts against the lower end of the shank, and two side plates N', which are affixed to the central part and extend on each side of the shank, to which they are removably affixed. The lower part of the point is on a line with the lower part of the heel-bar, and this line is parallel with the center line of the beam. When it is desired to lift and stir the earth to a greater extent than can be accomplished by the shank and point alone, I provide an additional lifting-plate O, which is a little wider than the point and is bifurcated at one end, the furcations straddling the heel-bar and the upper end being bolted to the shank by a bolt P, to lift and stir the soil beyond that which is lifted and stirred by the point.

In the operation of my plow the draft-animals are attached to the front end of the beam in the usual manner. The plow-point is set at the depth at which it is desired to stir the subsoil. The deepest depth is secured by lowering the shank as far through the beam as it will go and by lowering the regulating-arm to its lowest point in the stirrup. A less depth is secured by raising the shank or regulating-arm, or both. When it is desired to remove the plow from the ground, the bolt, which passes through the stirrup and regulating-arm, is removed, and the arm is raised to the top of the stirrup, thereby raising the front end of the beam, which causes the plow to draw out of the ground. If desired, the stirrup may be curved and provided with a toothed edge, and a ratchet and pawl may be affixed to the regulating-arm to regulate its position in the stirrup.

Instead of providing a socket in the rear end of the beam for the reception of the point-holding shank the beam itself may be bent downward at the proper angle and form the shank.

It will be observed that the wheel-attaching arms are pivotally attached to the plow-beam and the regulating-arm is attached to these bars above the beam, the pivotal bolt, which unites the beam to the wheel-attaching arm, becomes a fulcrum, and that when the position of the rear end of the regulating-arm is changed it changes the position of the plow-point, and at whatever depth it may be fixed in the ground the lower line of the point and the heel-bar are parallel to the center line of the beam, and that this center line is always parallel with the surface of the ground. My truck, with its attaching-bars and regulating-arm, may be applied to any plow.

Having described my invention, what I claim as new, and desire to secure by Letters Patent, is—

1. A subsoil-plow comprising a beam; a stirrup affixed to said beam near the rear end; a shank at the rear end of the beam; a heel-bar affixed to the rear end of said shank; a point extending from said shank toward the front of the beam, removably affixed to said shank; said point comprising a central part which abuts against the shank, and two side plates affixed to the central part and extending rearward on each side of the shank, and removably affixed thereto; a truck under the front end of the beam; attaching-bars affixed to the axle of the truck extending rearwardly and upwardly, pivotally attached to the beam intermediate the ends thereof; and a regulating-arm affixed to said attaching bars above the beam, and means to regulate the position of said arm.

2. In a subsoil-plow, the combination of a shank having a heel-bar, with a point composed of a central shank-abutting portion, and two rearwardly-extending side plates affixed to said central portion, and removably affixed to the shank.

3. A point for a subsoil-plow, comprising a central shank-abutting portion, and two side plates affixed to said central portion, and extending rearwardly thereof.

4. In a subsoil-plow having a shank, heel-bar and point, an auxiliary stirring-plate therefor composed of a rectangular plate, having one end bifurcated and a hole in the other end; said furcations being adapted to straddle the heel-bar, and said hole in the other end being adapted for the reception of a bolt to attach said plate to the shank.

In witness that I claim the foregoing I have hereunto subscribed my name this 10th day of October, 1901.

T. J. HUBBELL.

Witnesses:
G. E. HARPHAM,
MATTIE MCGINNIS.